United States Patent [19]

Roemer et al.

[11] Patent Number: 4,872,248
[45] Date of Patent: Oct. 10, 1989

[54] METHOD OF MAKING A PLAIN BEARING SHELL

[75] Inventors: Erich Roemer, Wiesbaden; Matthäus Kühn, Östrich-Winkel; Leonhard Maurer, Walluf, all of Fed. Rep. of Germany

[73] Assignee: Glyco-Metall-Werke, Daelen & Loos GmbH, Wiesbaden, Fed. Rep. of Germany

[21] Appl. No.: 204,372

[22] Filed: Jun. 9, 1988

Related U.S. Application Data

[62] Division of Ser. No. 514,311, Jul. 15, 1983, Pat. No. 4,775,249.

[30] Foreign Application Priority Data

Aug. 18, 1982 [DE] Fed. Rep. of Germany ....... 3230700

[51] Int. Cl.[4] .......................................... B21D 53/10
[52] U.S. Cl. ..................... 29/149.5 DP; 29/149.55; 29/149.5 R; 29/149.5 C
[58] Field of Search .................... 29/149.5 R, 149.5 S, 29/149.5 DP, 149.5 B, 149.5 C; 72/325, 407, 354, 416; 384/296, 273, 294, 276, 288, 295, 296

[56] References Cited

U.S. PATENT DOCUMENTS

| | | | |
|---|---|---|---|
| 2,814,856 | 12/1957 | Ward | 29/149.5 DP |
| 2,972,781 | 2/1961 | Levy | 72/416 X |
| 3,251,119 | 5/1966 | Kingsbury et al. | 29/149.5 S |
| 3,375,563 | 4/1968 | Kingsbury et al. | 29/149.5 S |
| 4,103,407 | 8/1978 | Elizalde et al. | 72/416 X |
| 4,203,184 | 5/1980 | Gray | 29/149.5 DP |
| 4,351,175 | 9/1982 | Ichikawa et al. | 29/149.5 DP X |

FOREIGN PATENT DOCUMENTS

| | | | |
|---|---|---|---|
| 583601 | 9/1959 | Canada | 29/149.5 R |
| 1119831 | 6/1956 | France | 29/149.5 R |
| 0107233 | 6/1983 | Japan | 29/149.5 R |
| 762286 | 11/1956 | United Kingdom | 291/149.5 R |
| 1180742 | 2/1970 | United Kingdom | 29/149.5 R |

Primary Examiner—Timothy V. Eley
Assistant Examiner—Peter D. B. Vo
Attorney, Agent, or Firm—Herbert Dubno

[57] ABSTRACT

Plain bearings, particularly thin-walled plain bearing liners, are provided with radial projections for fixing and as an aid to assembly, e.g. with lugs, on the outer side of the outer part of the bearing, without using the whole thickness of the outer part of the bearing, so that the inner surface of the outer part of the bearing, which carries the functional layer, remains along its whole length cylindrically curved and smooth. Such outer projections are formed on a part of the thickness of the outer part of the bearing by radial shaping of the material. This is made on the joint face of bearing liners or on one or the other of the axial end faces of bearing liners or bushes or also on any desired place of the outer peripheral surface of the outer part of the bearing.

4 Claims, 4 Drawing Sheets

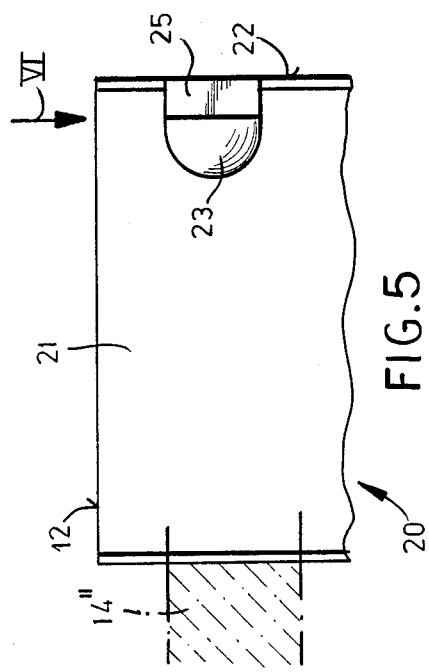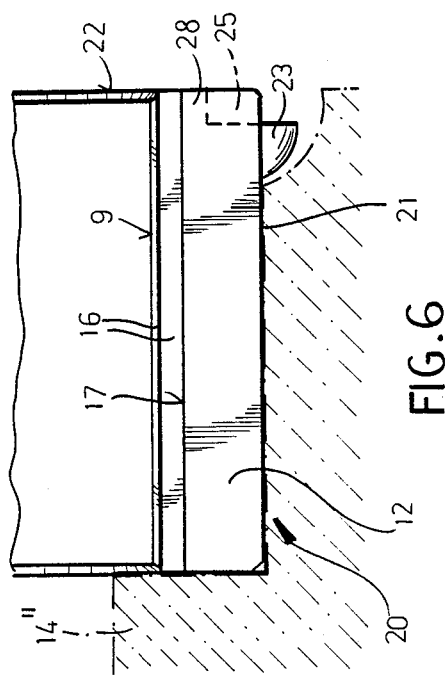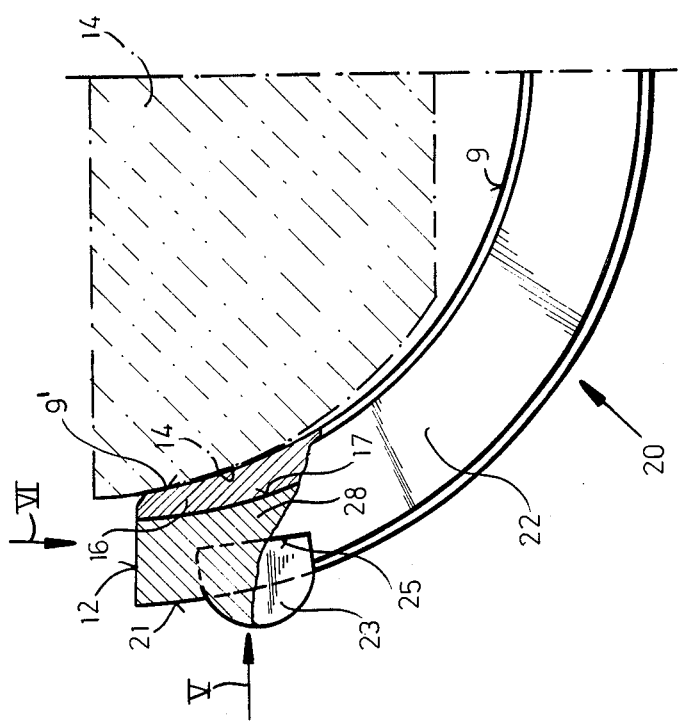

METHOD OF MAKING A PLAIN BEARING SHELL

This is a divisional of co-pending application Ser. No. 514,311 filed on July 15, 1983 now U.S. Pat. No. 4,775,249.

FIELD OF THE INVENTION

The invention relates to a plain bearing in the form of bushes or in the form of bearing liners of a solid or multi-layer material, having at least one outer radial or axial projection for fixing the unit or to aid assembly thereof.

BACKGROUND OF THE INVENTION

Thin-walled plain bearings, as are presently used mainly by engine manufacturers, are mostly provided with mounting lugs. Such lugs are normally made by an impact tool, by means of which a small portion of the bearing surface is bent outwards at the joint face. In this way an external lug is formed; however in the sliding surface a corresponding depression is provided. These lugs serve mostly to aid installation so that the plain bearings cannot be incorrectly mounted.

The lugs can, in addition, prevent or at least hinder slow movement of the plain bearing during operation, both in the axial and in the peripheral directions. The receiving hole in the housing has a notch corresponding to the lug in which the lug engages.

Also other devices serve as assembly aids. So for instance it is known to make in an apex of the bearing a so-called wart by the impression of a stamping tool from the interior. The wart is an elevation on the outer part of the bearing and during manufacture a corresponding depression is simultaneously produced in the sliding surface of the bearing. Other fixing methods include e.g. the provision of a hole in the bearing and the insertion of a retention dowel or locating peg in the hole. This method is, however, expensive because the locating peg must be very accurately made (i.e. with narrow tolerances) to perfectly sit in the hole in the housing. In addition, it must be provided with a shoulder so that if it becomes loose it will not move into the bearing which could result in breakdown. Blind holes may be made in thicker bearing liners so as to prevent the peg from travelling. Even in this case, however, there must be a good fit between the peg and the corresponding hole in the casing.

The depression frequently formed on the inner surface (sliding surface) of the bearing necessarily causes disturbance in the buildup of the film of lubricant and consequently gives rise to a local reduction of loading capacity. Such lugs or other depressions are for these reasons situated as much as possible at a place where the loading of the bearing is small. This is not possible in many cases and this results, if allowed by the design, in possible widening of the bearing and therefore increased friction. If no fixing is provided there is an increased risk for reasons which have already been described.

OBJECT OF THE INVENTION

The object of the invention is to find means and ways to provide on the outer side of the bearing liner economically an outer projection as an aid for assembly or fixing, without having to accept a depression in the sliding surface of the bearing and without the need for expensive additional work or accuracy of fitting.

SUMMARY OF THE INVENTION

This object is achieved in that the lug-forming material is obtained from the outer part of the bearing without affecting the sliding surface. It is also possible to provide a protection on the outer part of the bearing additionally.

Preferred is the outer projection of lug material obtained locally from a portion of the thickness of the outer part of the bearing by the action of high pressure and corresponding support from the inner side of the bearing. In this way a lug is produced without a depression being made in the inner surface of the bearing. Because after forming of the lug the sliding surface is usually machined, a lug made in this way does not cause any geometrical inaccuracies. Also the manufacture of the bearing liners has advantages. In a preferred embodiment of the invention the outer projection of bearing liners is of a material obtained locally by the action of a high pressure on to the joint face and corresponding supporting on the inner side of the bearing. This produces, when looking from the joint face (in the initial state) above the lug, i.e. there where the material has been obtained by upsetting, necessarily a depression. During possible subsequent broaching or other machining of the joint face preferably so little material is removed that, as before, a corresponding depression remains in the outer part of the bearing. This has the advantage that no burr is formed during machining of the lug, which would have to be subsequently removed. A burr on the recess in the joint face is so situated, when suitable machined, that it lies in this recess so that such a burr can have adverse effect neither during mounting of the bearing nor during its subsequent operation. This therefore makes the step "deburring of lug" unnecessary and also increases the certainty that imperfect deburring (which must normally be made manually), which could adversely influence the function, is precluded.

In another embodiment the outer projection may be made of a material obtained locally by the action of a high pressure on to an axial end face of the bearing and corresponding supporting. This embodiment has practically the same advantages in manufacture as that in which the lug was made by using material from the outer part of the bearing in the area of the joint face. Forming of the lug from the material of the outer part of the bearing on one or both axial end faces of the bearing may be made both on bush-type plain bearings and on bearing liners.

In principle the outer projection may be made, according to the invention, on any desired part of the outer surface of the bearing of material squeezed out radially from the outer part of the bearing by two mutually opposite high pressures acting laterally, preferably tangentially, on to the outer surface of the outer part of the bearing and corresponding supporting.

In principle the making of lugs according to the invention is possible both for plain thrust bearings and thrust-journal plain bearings.

BRIEF DESCRIPTION OF THE DRAWING

Three embodiments of the invention will now be described, by way of example, with reference to the accompanying diagrammatic drawing, in which:

FIG. 4 is an axial partial view, partly in section, of a bearing liner provided with a radial projection made by pressing from one axial end face;

FIG. 5 is a partial view in the direction of arrow V in FIG. 4;

FIG. 6 is a partial plan view of the joint face in the direction of arrow VI in FIGS. 4 and 5;

SPECIFIC DESCRIPTION

Figure 1:
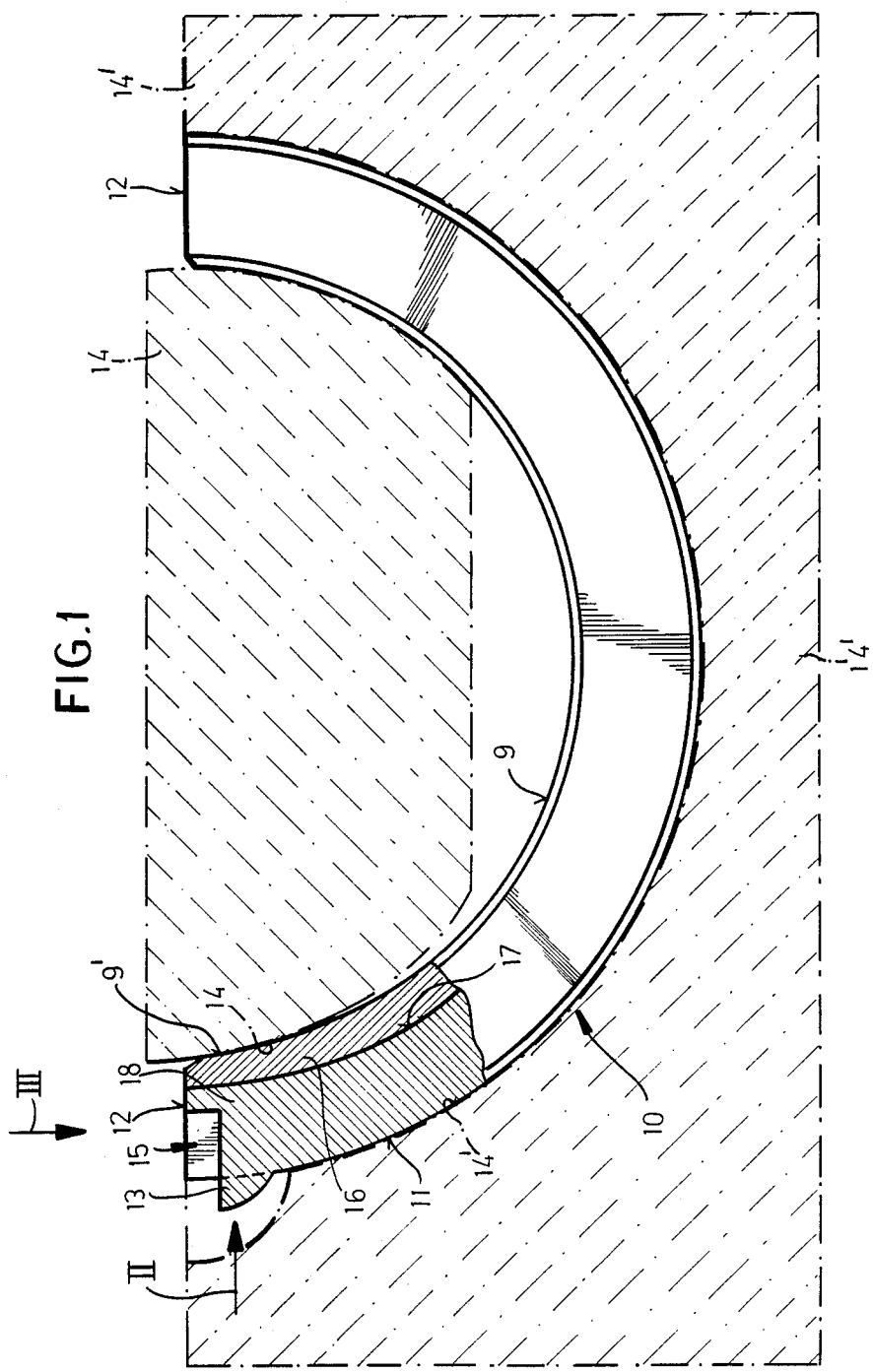
FIG. 1 is a partial elevation viewed from one end (partly sectioned) of a bearing liner with a lug pressed from the joint face.
Figure 2:
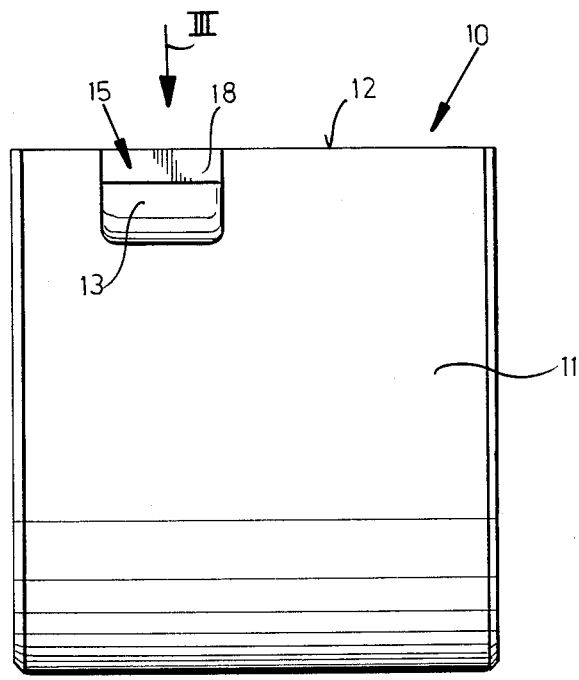
FIG. 2 is a view of the bearing liner according to FIG. 1 in the direction of arrow II in FIG. 1.
Figure 3:
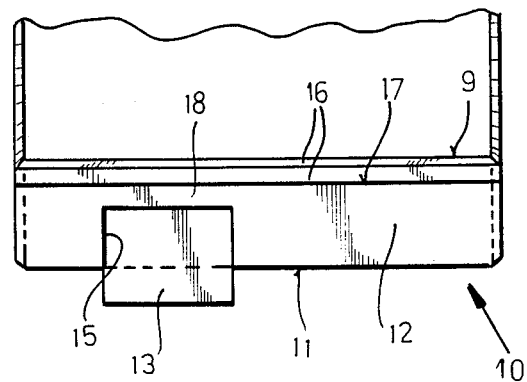
FIG. 3 is a plan view of the joint face of a bearing liner according to FIG. 1 in the direction of arrow III in FIGS. 1 and 2.

In the bearing liner or shell body 10 according to FIGS. 1 to 3 is made a radial projection 13 on the outer side of the outer part 11 (which lies in a plane parallel to an axis of the bearing), by upsetting from the joint face 12, while a suitable support 14 bears on the inner surface (i.e. bearing sliding surface 9 (which is the inner functional surface of the bearing) of the bearing liner 10, as is indicated by a chainlined area. A recess 15 is formed in the joint face 12 during the upsetting of the radial projection 13, which recess may be largely retained during broaching or other machining of the joint face 12. The support on the outer part 11 of the bearing has the reference 14'. Between the recess 15 or the radial projection 13 and the inner surface 17 of the outer part of the bearing carrying the functional layer 16 remains an intact undeformed position in the form of a strip 18 of material of the outer part of the bearing, which ensures, that the inner surface 17 is smooth even in the region of the radial projection 13, i.e. that there is no depression in the sliding surface of the bearing consequently the layer 16 is uninterrupted smooth and continuous in the region of the undeformed position 18 or strip.

In the embodiment shown in FIGS. 4 to 6 is a bearing liner 20 (or bush) formed or upset at its outer part 21 from the end face surface 22 to form the radial projection 23. On the end surface 22 is therefore made a recess 25 which partly remains even if the end face 22 is machined. Between the recess 25 or the radial projection 23 and the inner surface of the outer part 21 of the bearing remains a strip 28 of material. Also preserved is the smoothly extending cylindrically curved inner surface of the sliding surface 9, 9' of the outer part 21 of the bearing.

In the embodiment according to FIGS. 4 and 6 the radial projection 23 is spaced from the joint face 12. In principle the radial projection 23 may be made at any part of the outer periphery of the bearing liner 20 according to the desired application. This may be even in the immediate vicinity of the joint face 12. The support in the end face opposite to the end face 22 has the reference 14".

The provision of a radial projection 23 from the axial end face 22 is possible, without any difference, both for bearing liners and bearing bushes.

Figure 8:
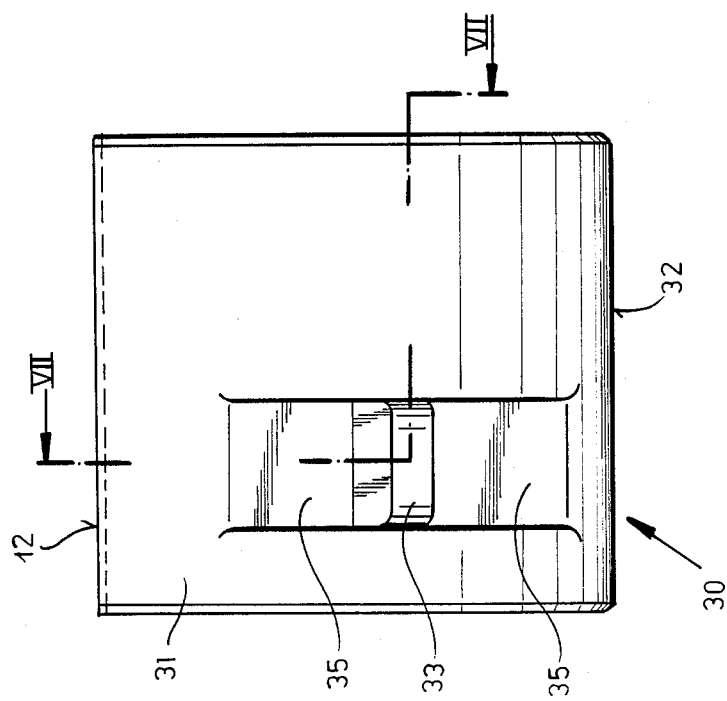
FIG. 8 is a view in the direction of arrow VIII in FIG. 7.
Figure 7:
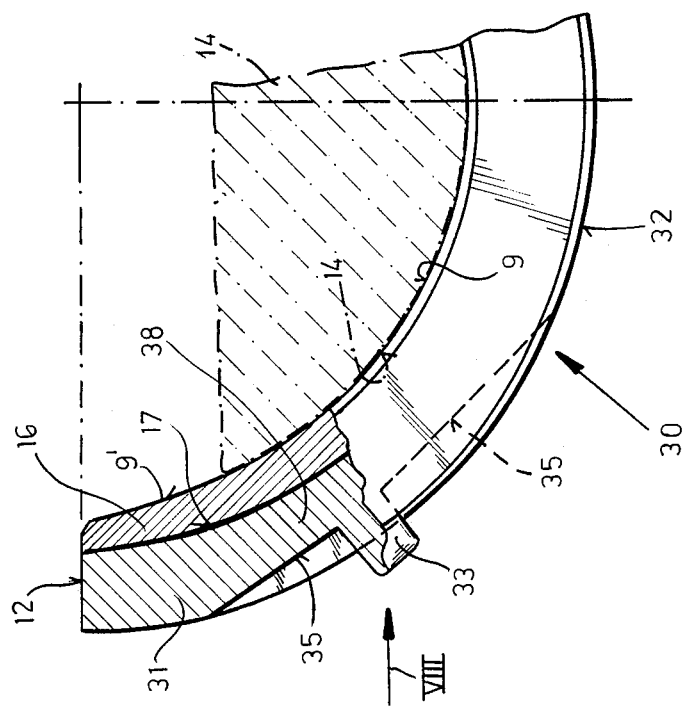
FIG. 7 is a partial view, partly in section, of a bearing liner provided with a radial projection in the outer surface.

In the embodiment according to FIGS. 7 and 8 a radial projection 33 is made at a place of the outer peripheral surface 32 of the outer part 31 of the bearing selected at will according to the intended application. For this purpose a high pressure is exerted in tangential direction by a suitable tool from two opposite sides, (i.e. two mutually opposite high pressures acting laterally) that two recesses 35, are formed into the outer peripheral surface 32 of the outer part 31 of the bearing and the material between them is formed as a projection or lug 33 radially outwardly, while the inner side of the bearing at 9, 9' is supported. A strip 38 of material remains between the recesses 35 or between the projection 33 and the inner surface of the outer part 31 of the bearing during this operation, and the inner surface 9, 9' of the outer part 31 of the bearing remains along its whole length smooth and cylindrically curved. The provision of the radial projection 33 according to FIGS. 7 and 8 may also be made on bearing bushes.

The above-described formation of the radial projections by shaping or upsetting the material of the outer part of the bearing may be used also for thin-walled bearing liners, e.g. liners which are 2 mm or less thick. The thicker is the outer part of the bearing the less problematic is the shaping of the material for the formation of the radial projection.

We claim:

1. A method of making a plain bearing shell which comprises the steps of:
   forming a generally cylindrical bearing shell body having an inner functional surface and a joint face lying in a plane substantially parallel to an axis of said generally cylindrical bearing shell body;
   supporting said functional surface and the exterior of said generally cylindrical bearing shell body at least in a region of said joint face; and
   depressing material of said generally cylindrical bearing shell body only at a region outwardly of said functional surface in said region of said joint face in a direction perpendicular to said joint face to form a lug radially projecting from the exterior of said generally cylindrical bearing shell body and forming a recess directly above said lug, said lug facilitating positioning of said generally cylindrical bearing shell body while leaving a layer of material of said generally cylindrical bearing shell body between said recess formed by the depression of said material of said generally cylindrical bearing shell body and said functional surface.

2. The method defined in claim 1 wherein an uninterrupted smooth and continuous layer of a material forming a bearing sliding surface is formed all along said functional surface on said generally cylindrical bearing shell body and is continuous on a side of an intact undeformed portion of the material of said generally cylindrical bearing shell body opposite that along which said recess and said lug are disposed.

3. The method defined in claim 2 wherein said recess is formed in and opens at said joint face.

4. The method defined in claim 1 wherein said lug is formed from material gathered radially from an outer part of said body by the application of two mutually opposite high pressures acting laterally on the outer peripheral surface of said outer part of said body.

* * * * *